United States Patent
Berggren et al.

(10) Patent No.: US 7,839,125 B2
(45) Date of Patent: *Nov. 23, 2010

(54) APPARATUS AND METHOD FOR OPTIMIZATION OF POWER FLOW CONTROL BETWEEN DIFFERENT PATHS OF A HIGH VOLTAGE NETWORK IN DEPENDENCE OF A DISTURBANCE IN THE NETWORK

(75) Inventors: Bertil Berggren, Västerås (SE); Lennart Ängquist, Enköping (SE)

(73) Assignee: ABB Research Ltd., Zürich (CH)

( * ) Notice: Subject to any disclaimer, the term of this patent is extended or adjusted under 35 U.S.C. 154(b) by 5 days.

This patent is subject to a terminal disclaimer.

(21) Appl. No.: 12/280,656

(22) PCT Filed: Feb. 22, 2007

(86) PCT No.: PCT/SE2007/000162

§ 371 (c)(1),
(2), (4) Date: Jan. 12, 2009

(87) PCT Pub. No.: WO2007/097696

PCT Pub. Date: Aug. 30, 2007

(65) Prior Publication Data

US 2009/0134850 A1    May 28, 2009

Related U.S. Application Data

(60) Provisional application No. 60/775,805, filed on Feb. 23, 2006.

(51) Int. Cl.
*G05F 3/04* (2006.01)
(52) U.S. Cl. .................... 323/216; 323/340
(58) Field of Classification Search ............. 323/216, 323/218, 255, 256, 257, 258, 300, 301, 340, 323/341, 343
See application file for complete search history.

(56) References Cited

U.S. PATENT DOCUMENTS

| | | | |
|---|---|---|---|
| 3,821,456 A | | 6/1974 | Havas |
| 5,166,597 A | * | 11/1992 | Larsen et al. ............... 323/215 |
| 5,227,713 A | * | 7/1993 | Bowler et al. ............... 322/58 |
| 5,469,044 A | * | 11/1995 | Gyugyi et al. ............... 323/207 |
| 5,907,239 A | * | 5/1999 | Pelletier et al. ............... 323/361 |
| 6,737,837 B1 | * | 5/2004 | Halvarsson et al. ......... 323/205 |
| 2008/0157748 A1 | * | 7/2008 | Berggren et al. ............ 323/356 |
| 2008/0258559 A1 | * | 10/2008 | Berggren et al. ............ 307/31 |
| 2008/0265848 A1 | * | 10/2008 | Berggren et al. ............ 323/211 |
| 2009/0134850 A1 | * | 5/2009 | Berggren et al. ............ 323/215 |
| 2009/0218993 A1 | * | 9/2009 | Berggren et al. ............ 323/205 |
| 2009/0251932 A1 | * | 10/2009 | Owen ........................... 363/44 |

OTHER PUBLICATIONS

Gerbex et al, "Optimal location of muti-type FACTS devices in a power system by means of genetic algorithms", Aug. 2001 IEEE transactions on power systems, vol. 16, No. 3, pp. 537-544.*

(Continued)

*Primary Examiner*—Jeffrey L Sterrett
(74) *Attorney, Agent, or Firm*—Venable LLP; Eric J. Franklin

(57) ABSTRACT

A method for controlling the power flow in an ac transmission line including prompt handling of voltage recovery and only thereafter thermal constraints.

12 Claims, 4 Drawing Sheets

OTHER PUBLICATIONS

E.V. Larsen; A classical approach to constructing a power flow controller; IEEE, vol. 2, Jul. 1999; pp. 1192-1195.

Bridenbaugh et al.; Voltage Control Improvement Through Capacitor and Transformer Tap Optimization; IEEE Transactions on Power Systems; vol. 7, No. 1; Feb. 1, 1992; pp. 222-227.

Bjelogrlic et al.; Application of Newton's Optimal Power Flow in Voltage/Reactive Power Control; May 1989; pp. 105-111.

PCT/ISA/210—International Search Report—Jun. 29, 2007.

PCT/ISA/237—Written Opinion of the International Searching Authority—Jun. 29, 2007.

* cited by examiner

APPARATUS AND METHOD FOR OPTIMIZATION OF POWER FLOW CONTROL BETWEEN DIFFERENT PATHS OF A HIGH VOLTAGE NETWORK IN DEPENDENCE OF A DISTURBANCE IN THE NETWORK

CROSS-REFERENCE TO RELATED APPLICATIONS

This application claims priority to U.S. provisional patent application 60/775,805 filed 23 Feb. 2006 and is the national phase under 35 U.S.C. §371 of PCT/SE2007/000162 filed 22 Feb. 2007.

FIELD OF INVENTION

The present invention relates to control of power flow in a high voltage ac transmission system comprising a dynamically assisted phase-shifting transformer.

BACKGROUND

A phase shifting transformer (PST) is previously known for controlling the power flow in an ac transmission line. Such PST comprises a tap changer that serially connects or disconnects additional windings of the transformer. By doing so the phasor orientation is controlled. Power is then moved from adjacent phases to a single phase by connections between windings excited by different parts of the magnetic circuit. In a pure phase shifting transformer a voltage in quadrature to the source voltage is injected to the line.

A phase shifting transformer may be used to control the distribution load between parallel lines to increase total power transfer. Advantageous is the capability of the phase shifting transformers to block parasitic power flow due to phase angle difference in a feeding network. Power may be distributed to customer in a defined way and circulating power flows may be avoided.

The use of a PST is advantageous in that the PST has relatively low reactive power consumption. There is no risk of a subsynchronous resonance (SSR) and it is powerful also at low current conditions.

The use of a PST however offers a slow control speed. The tap changer has to go through every tap position in a sequential manner. Each tap change is effected in the order of 3-5 seconds. Thus the PST cannot participate in a decisive way in a transient period following a power disturbance. Further frequent tap changing, in particular at high current conditions, increases the need for maintenance.

The tap changer is a mechanical device and thus slow and an object to mechanical wear. It has a maximum regulation voltage range of 150 kV and the maximum number of operating steps is less than 35. The maximum tap voltage is in the order of 4000-5000V between two tap positions and the maximum rated throughput current is about 3000-4500 A. The maximum power handling capacity is 6000-8000 kVA/tap and there is a short circuit thermal limit. Small voltage steps results in a greater number of mechanical operations.

Another way to control the power flow in an ac transmission line is the use of a controlled series compensator (CSC). Such CSC comprises one or a plurality of thyristor switched inductive devices. The CSC may also comprise one or a plurality of thyristor switched capacitive devices, often in combination with an inductor. The capacitive device or the inductive device is connected in a parallel branch with a thyristor switch. By controlling the thyristor switch the inductive or the capacitive device is connected or disconnected to the transmission line. Thus the phasor orientation is controlled by connecting or disconnecting a desired number or combination of inductances or capacitances. The regulation is rapid since there is no mechanical switching device involved.

A CSC is controllable from full inductive to full capacitive regulation, and vice versa, within a few fundamental frequency cycles and is thus capable of being a powerful control device in a transient period following a power disturbance. In comparison with the mechanical tap changer of a PST, the need for maintenance of the thyristor controlled CSC does not increase as a consequence of frequent control actions. A CSC is therefore suitable for closed loop control.

Highly populated cities are often characterized by having large consumption of active and reactive power while the production sources are remotely located. This frequently has the consequence that the transmission lines feeding the city are heavily loaded and that dynamic reactive power resources are lacking.

SUMMARY OF THE INVENTION

An object of the present invention is to provide a power flow control of an ac power transmission that is rapid and that does not involve the drawbacks of the single use of either a PST or a CSC.

Another object of the present invention is to provide a power flow control of an ac power transmission wherein bottlenecks with a combination of thermal and voltage constraints, typically found in city infeed applications, are removed or at least mitigated.

The invention is based on the recognition of the different time scales that apply to voltage recovery support and thermal limits.

According to a first aspect of the invention a method is provided for controlling the power flow in a high voltage ac transmission system comprising a phase shifting transformer having tap changing means, characterized by a controlled series compensator having a controllable reactance means comprising one or several capacitive reactance steps, and control means for controlling the phase shifting transformer and the controlled series compensator in coordination, the method comprising the following steps: prior to a disturbance, operating the phase shifting transformer and the controlled series compensator to achieve system loss minimization, after a disturbance, operating the controlled series compensator to achieve voltage recovery support, and after voltage recovery, operating at least one of the phase shifting transformer and the controlled series compensator to handle thermal constraints.

In a preferred embodiment, the step of operating the controlled series compensator to achieve voltage recovery support comprises switching in capacitive reactance steps, which provides rapid voltage recovery, particularly in city areas, where transmission lines normally are heavily loaded and dynamic reactive power resources are lacking.

According to further aspects of the invention, an apparatus for controlling the power flow in a high voltage network, a power system, a computer program product, and a computer readable medium are provided, which uses the method according to the invention.

BRIEF DESCRIPTION OF DRAWINGS

Other features and advantages of the present invention will become more apparent to a person skilled in the art from the following detailed description in conjunction with the appended drawings in which.

DETAILED DESCRIPTION OF PREFERRED EMBODIMENTS

In the following a detailed description of preferred embodiments of the present invention will be given.

Figure 1:
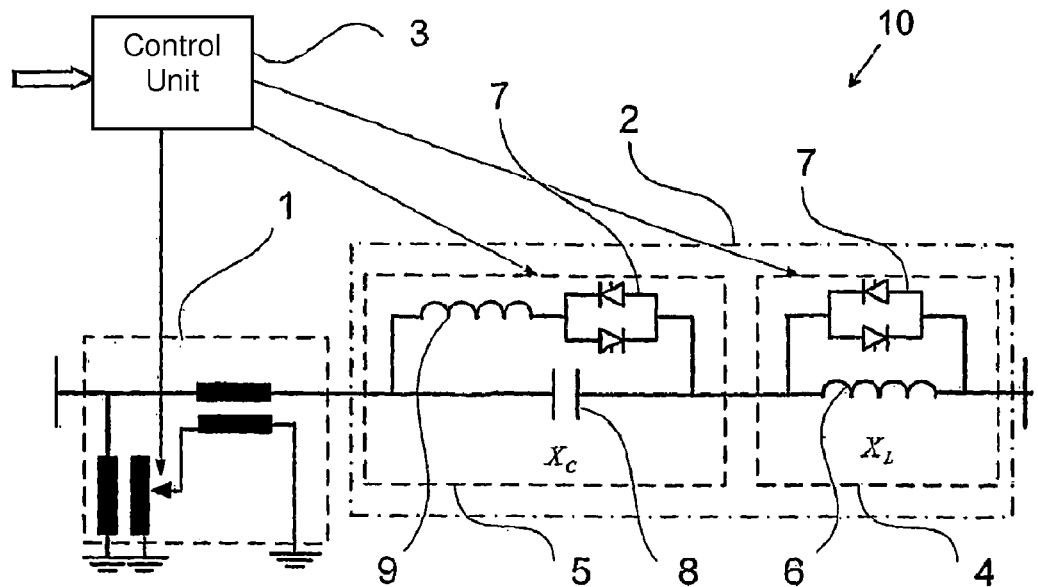
FIG. 1 is a principal circuit of a control apparatus according to the invention.

An apparatus, generally referenced 10, for controlling the power flow according to the invention is shown in FIG. 1. The apparatus comprises a tap changer controlled phase shifting transformer (PST) 1, a controlled series compensator (CSC) 2 and a control unit 3. The control unit is a computer based device executing a computer program product.

The CSC comprises a first reactance unit 5 that includes a capacitive unit 8 and a thyristor switch 7 for connecting and disconnecting the capacitive unit. In the embodiment shown in FIG. 1 the first reactance unit 5 further comprises an inductive unit 9 in series with the thyristor switch 7. The inductive unit 9 serves the function of improving the switching performance of the first reactance unit.

The CSC 2 further comprises a second reactance unit 4 that includes an inductive unit 6 and a thyristor switch 7 for connecting and disconnecting the inductive unit. The single capacitive and inductive reactance units are shown by way of example. It lies within the scope of the invention to combine any number of capacitive and inductive steps. Thus the controlled series compensation device may comprise a plurality of both capacitive and inductive circuits, including only capacitive circuits and only inductive circuits.

It is thus realized that the CSC may be realized in different configurations. The CSC may comprise switchable capacitive units by which the CSC is controllable in discrete steps. The CSC may also comprise a combination of capacitive and inductive units and thus being controllable in discrete steps. The CSC may alternative comprise a plurality of boostable capacitive steps and a plurality of inductive step that offers the CSC to be continuously controllable. Thus, one or several of the capacitive steps will be equipped with low boost capability such that the overall characteristic of the installation is inductive in the sub-synchronous frequency range. This remedies a risk of sub-synchronous resonance.

Figure 2:
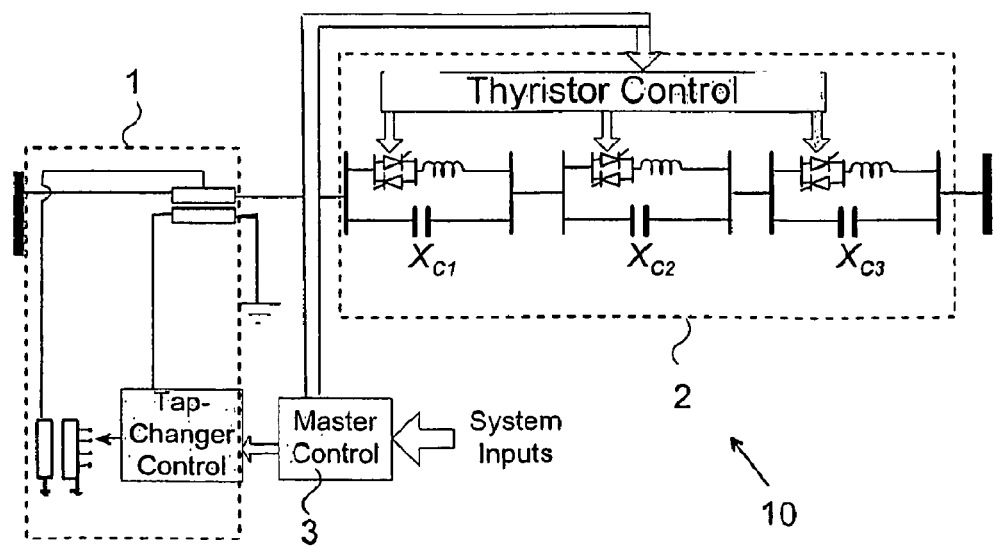
FIG. 2 shows a capacitive version of an apparatus according to the invention.

In a preferred embodiment of the invention for this application, the apparatus 10 comprises a PST 1 and a CSC 2 comprising thyristor controlled capacitive reactance steps denoted $X_{C1}$, $X_{C2}$, $X_{C3}$, as indicated in FIG. 2.

Figure 3:
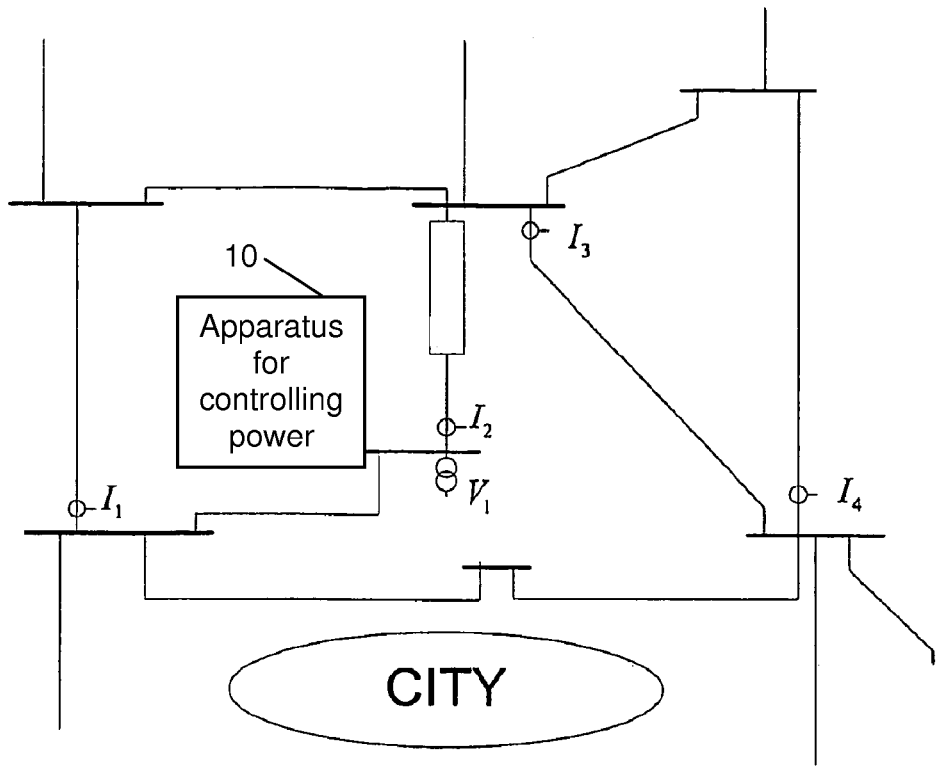
FIG. 3 is an illustration of a power system feeding a city.

FIG. 3 illustrates by way of a single line diagram a power system feeding a city through a number of parallel paths. The apparatus 10 is in this case installed on the path which has the largest remaining thermal margin. This is typically the line with the largest inductive reactance in the transmission interface between remote production sources and a load, such as a city, i.e. the line which naturally takes the lowest load. Each critical line in the interface is equipped with current measuring device ($I_1$, $I_2$, $I_3$, $I_4$) and each current measurement is communicated to the control system of the apparatus 10 through e.g. optical fiber communication. In addition, also a voltage measurement device ($V_1$) is available either locally or remote and the voltage measurement is made available to the control system of the apparatus 10.

A typical critical disturbance would be a line fault followed by a permanent disconnection of the faulted line. Assuming that the power flow would be unevenly distributed on the remaining transmission paths and the apparatus 10 is installed on the path designed to pick up more load in order to avoid overloading the parallel paths, the sequence of control objectives could be as follows:

In the pre-disturbance period, focus is on minimizing system losses, and particularly active system losses. A set-point would typically be obtained from a control center possibly based on an optimal power flow calculation.

Immediately following the fault, all capacitive steps are switched in for the purpose of supporting a voltage recovery. The indication of low voltages and the need of supporting a voltage recovery is obtained through the voltage measurement. This is in particular important for cities with a considerable amount of electrical motor loads, e.g. in the form of air conditioning units. Without voltage recovery support these units would have a tendency to stall and thus become a significant drain on reactive power, which in turn may result in local voltage collapse and cascading outages.

Once the voltages have recovered, the control objective would alter to focus on thermal limits. The indication of violation of thermal limits is obtained through the current measurements on both parallel lines and the path in which the apparatus 10 is installed. By combining the capability of the PST and the capacitive steps, or alternatively by using the capability of either the PST or the capacitive steps, the power flow is controlled to avoid overload neither in the path in which the apparatus 10 is installed nor in parallel paths. Furthermore, if the initiating events are so severe that the overload cannot be completely removed, the power flows can be distributed to give the operator as much time as possible to take remedial actions. This would typically imply that the overload is evenly distributed between the parallel paths.

The method according to the invention is based on the recognition of the different time scales that apply to voltage recovery support and thermal limits. Whereas voltage recovery is critical directly after, up to a few seconds following, fault clearance, thermal limits become an issue after in the order of several minutes, typically in the order of 20 minutes. Thus, initially after fault clearing, when voltage recovery support should be provided, a moderate overload for a few seconds of the path in which the apparatus 10 is installed will not result in damaging temperatures for equipment in the path. Operation to handle thermal constraints is thus performed during a period of more than 1 minute, and preferably about 15-30 minutes until operation is returned to system loss minimization.

Figure 6:
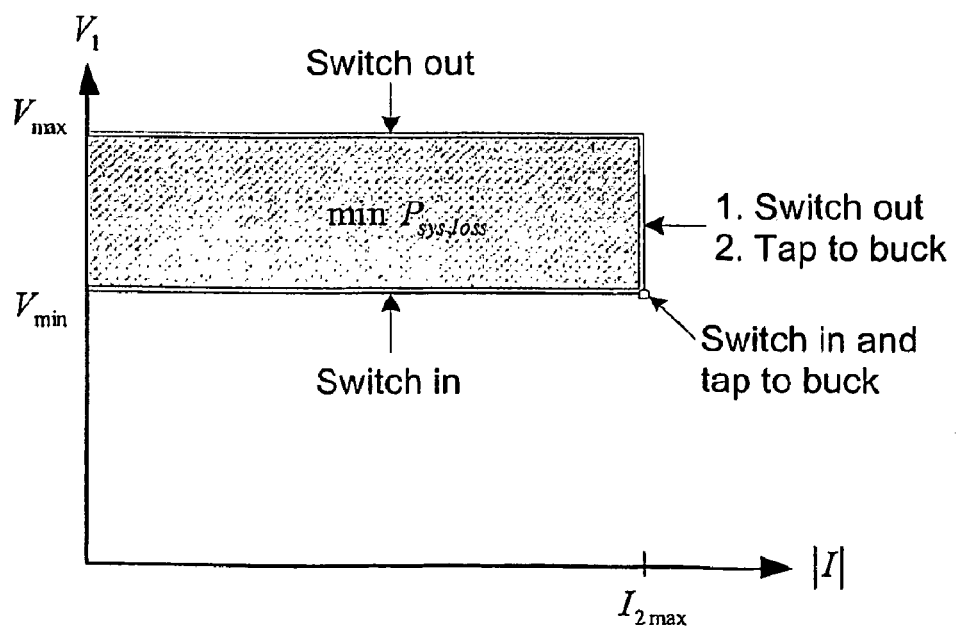
FIG. 6 is a diagram explaining system loss minimization during normal operation.
Figure 4:
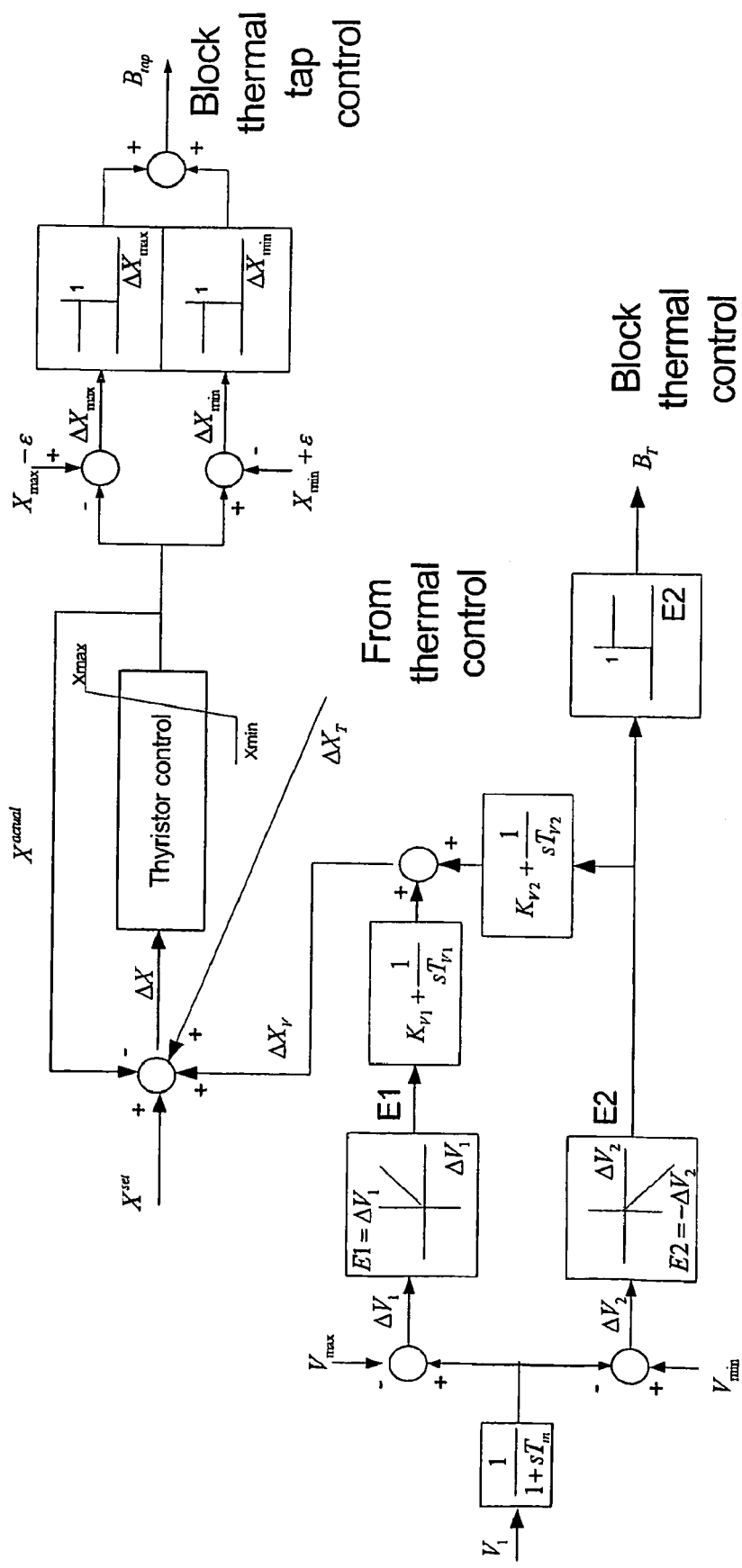
FIG. 4 is an example of a voltage control logic.
Figure 5:
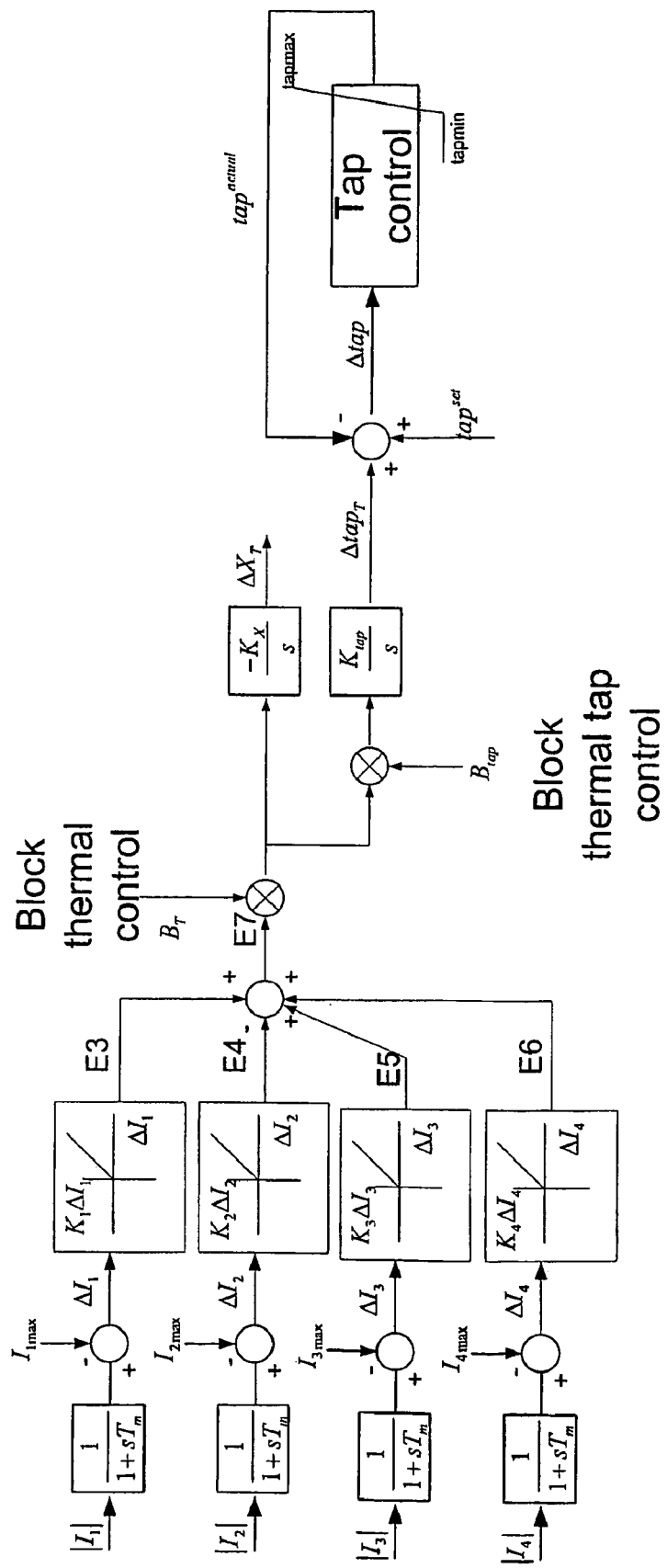
FIG. 5 is an example of a thermal control logic.

FIG. 4 and FIG. 5 illustrate an implementation of the control logic. During the pre-disturbance period, i.e. the situation for in the order of 99% of the time, focus is on minimizing system losses. A system control centre issues set values for the tap-changer of the PST ($tap^{set}$) and for the controllable capacitive reactance $X^{set}$ such that system losses are minimized. Assuming that the currents in the parallel paths are within limits, system loss minimization can be performed within the area indicated in the diagram of FIG. 6, showing the voltage $V_1$ on the X axis and the absolute value of the current on the Y axis. System loss minimization should in this context be interpreted as loss minimization in the transmission system by means of e.g. an optimum power flow calculation.

Assuming now that a line fault occurs with low voltages as a consequence, the measured voltage magnitude $V_1$ drops below the threshold $V_{min}$ in FIG. 6 which results in the signal $\Delta V_2$ becoming positive and the signal E2, which prior to the fault was zero, assumes the value E2=−ΔV$_2$. This signal is fed to a PI-block such that the signal ΔX$_V$ is generated which is added to the set value X$^{set}$ such that more and preferably all capacitive reactance steps are switched in to support the voltage recovery. Having fast thyristor switched capacitances available is very advantageous in this situation since it allows fast voltage recovery support within a fraction of a second. At the same time as the signal E2 becomes negative, indicating low voltages, a blocking signal B$_T$ becomes zero preventing the thermal control from acting. Once the voltage is again within limits, the blocking signal B$_T$ again becomes 1, allowing thermal control. If too high voltages are experienced following the voltage recovery, a positive signal is added to ΔX$_V$ in order to switch out capacitive reactance step such that the voltage returns within limits.

If it is assumed that the original fault occurred on a parallel line and that the fault was cleared by permanent disconnection of the line, thermal limits may need to be attended. The thermal control logic takes as input the current magnitudes measured on the parallel lines (I$_1$, I$_3$, I$_4$) and the current magnitude on the own path (I$_2$). These current magnitudes are then compared with thermally determined current magnitude thresholds. If all current magnitudes are below the thresholds, i.e. all ΔI$_1$, ΔI$_2$, ΔI$_3$, ΔI$_4$ are negative, then the signals E3=E4=E5=E6=0 and no further action will be taken. Similarly, if the blocking signal B$_T$=0 no further action will be taken. Now, if the one or several of the thresholds are exceeded, the corresponding signals E3, E4, E5, E6 will assume positive values. These signals are summed up, E3, E5, E6 corresponding to the parallel paths with positive sign and E4 corresponding to the own path with negative sign. The weight of these signals relative the overloads are tuned via the constants K$_1$, K$_2$, K$_3$, K$_4$. If the sum E7 is positive this indicates that the power flow (current) through the apparatus 10 should be increased and vice versa if it is negative the power flow (current) should be decreased. Provided that the blocking signal B$_T$=1, the signal E7 is integrated and multiplied with a gain −K$_X$ such that a signal ΔX$_T$ is created and added to the set value X$^{set}$ to remedy the overload. Now, as long as the actual reactance X$^{actual}$ is within its physical maximum and minimum limits with some small margin ε, a blocking signal B$_{tap}$=0 prevents any tap-changer action. Once the controllable reactance is at a limit, the blocking signal B$_{tap}$=1 and the tap-changer will start to act to remedy the remaining overload.

Once the operator has assessed the situation and returned the system to a secure state, such that it once again can sustain disturbances without cascading outages, the signals ΔX$_V$, ΔX$_T$ and Δtap$_T$ are manually (but remotely) reset to zero such that the system loss minimization mode can be resumed by issuing the set-values X$^{set}$, tap$^{set}$.

Preferred embodiments of a method and an apparatus according to the invention have been described. It will be appreciated that these can be varied without departing from the inventive idea. Thus, the capacitive reactance steps can be implemented without an inductor serially connected with the thyristor bridge.

It should be emphasized that the examples of control logic described with reference to FIGS. 4 and 5 are in no way limiting. For instance, when handling the thermal constraints, it is possible to control the PST first and when it reaches its limits turn over the control to the controllable reactance. Similarly, it is possible to design the thermal control logic such that the PST and the controllable reactance share the responsibility for thermal control without requiring that one is in limit before the other starts to act.

The invention claimed is:

1. A method for controlling a power flow in a high voltage ac transmission system comprising a phase shifting transformer comprising a tap changer, a controlled series compensator having a controllable reactance element comprising one or several capacitive reactance units and a control unit for controlling the phase shifting transformer and the controlled series compensator in coordination, the method comprising:
    prior to a disturbance, operating the phase shifting transformer and the controlled series compensator to achieve system loss minimization,
    after a disturbance, operating the controlled series compensator to achieve voltage recovery support, and
    after voltage recovery, operating at least one of the phase shifting transformer and the controlled series compensator to handle thermal constraints.

2. The method according to claim 1, wherein operating the controlled series compensator to achieve voltage recovery support comprises switching in capacitive reactance steps.

3. The method according to claim 1, wherein operating the phase shifting transformer and the controlled series compensator to handle thermal constraints is performed during a period of more than 1 minute after operating the controlled series compensator to achieve voltage recovery support is initiated and until operation is returned to system loss minimization.

4. The method according to claim 1, wherein operating the controlled series compensator to achieve voltage recovery support is initiated within a fraction of a second after a disturbance.

5. The method according to claim 1, wherein operating the phase shifting transformer and the controlled series compensator to handle thermal constraints is performed during a period of about 15-30minutes after operating the controlled series compensator to achieve voltage recovery support is initiated and until operation is returned to system loss minimization.

6. A computer program product, comprising:
    a computer readable medium; and
    computer program instructions recorded on the computer readable medium and executable by a processor for performing a method for controlling power flow in a high voltage ac transmission system comprising a phase shifting transformer comprising a tap changer, a controlled series compensator having a controllable reactance element comprising one or several capacitive reactance units, and a control unit for controlling the phase shifting transformer and the controlled series compensator in coordination, the method comprising
    prior to a disturbance, operating the phase shifting transformer and the controlled series compensator to achieve system loss minimization,
    after a disturbance, operating the controlled series compensator to achieve voltage recovery support, and
    after voltage recovery, operating at least one of the phase shifting transformer and the controlled series compensator to handle thermal constraints.

7. A high voltage ac transmission system, comprising:
    at least two parallel lines, and
    an apparatus comprising a phase shifting transformer comprising a tap changer, a controlled series compensator comprising a controllable reactance element comprising at least one capacitive unit, and a control unit for controlling the phase shifting transformer and the controlled series compensator in coordination, wherein the control unit is arranged to perform a method comprising prior to a disturbance, operating the phase shifting transformer and the controlled series compensator to achieve system loss minimization, after a disturbance, operating the controlled series compensator to achieve voltage recovery support, and after voltage recovery, operating at least one of the phase shifting transformer and the controlled series compensator to handle thermal constraints arranged in one of said at least two parallel lines.

8. The system according to claim 7, wherein the apparatus is installed in the line with the largest remaining thermal margin.

9. The system according to claim 8, wherein the apparatus is installed in the line with the largest inductive reactance in the transmission interface between remote production sources and a load.

10. The system according to claim 8, wherein the load comprises a city.

11. An apparatus for controlling the power flow in a high voltage ac transmission system, the apparatus comprising:

a phase shifting transformer comprising a tap changer, a controlled series compensator comprising a controllable reactance element comprising at least one capacitive unit, a control unit for controlling the phase shifting transformer and the controlled series compensator in coordination, wherein the control unit is arranged to perform a method comprising prior to a disturbance, operating the phase shifting transformer and the controlled series compensator to achieve system loss minimization, after a disturbance, operating the controlled series compensator to achieve voltage recovery support, and after voltage recovery, operating at least one of the phase shifting transformer and the controlled series compensator to handle thermal constraints.

12. The apparatus according to claim 11, wherein one or several of the capacitive units will be equipped with low boost capability.

* * * * *